United States Patent [19]

Tyslauk

[11] 4,049,112
[45] Sept. 20, 1977

[54] CHAIN DRUM FOR CHAIN CONVEYORS

[75] Inventor: Willy Tyslauk, Lunen, Germany

[73] Assignee: Gewerkschaft Eisenhutte Westfalia, Westfalia, Germany

[21] Appl. No.: 641,326

[22] Filed: Dec. 16, 1975

[30] Foreign Application Priority Data

Dec. 19, 1974  Germany .............................. 2460099

[51] Int. Cl.² ............................................ B65G 23/06
[52] U.S. Cl. ................... 198/834; 198/728; 74/450
[58] Field of Search ............... 198/203, 728, 733, 834, 198/854; 74/243 R, 450

[56] References Cited

U.S. PATENT DOCUMENTS

| 2,340,509 | 2/1944 | Clarkson | 198/203 |
|---|---|---|---|
| 2,525,516 | 10/1950 | Bergmann et al. | 198/203 |
| 2,965,217 | 12/1960 | Dommann et al. | 198/203 |
| 3,049,221 | 8/1962 | Kilbourne | 198/203 |
| 3,159,047 | 12/1964 | Dable | 74/450 |
| 3,213,703 | 10/1965 | Fitzgerald | 74/243 R |
| 3,220,273 | 11/1965 | Christian | 74/450 X |
| 3,231,695 | 1/1966 | Greenhut | 198/203 X |
| 3,319,413 | 5/1967 | Costner | 74/450 X |
| 3,443,680 | 5/1969 | Brill | 198/203 |
| 3,724,285 | 4/1973 | Lapeyre | 74/243 R |

FOREIGN PATENT DOCUMENTS 839,702  6/1960  United Kingdom .................. 74/450

*Primary Examiner*—Johnny D. Cherry
*Assistant Examiner*—Richard K. Thomson
*Attorney, Agent, or Firm*—Sughrue, Rothwell, Mion, Zinn, and Macpeak

[57] ABSTRACT

A chain drum for a chain conveyor, in particular a chain flight conveyor mounted on the cutting jib of a cutter-loader, consists of a split sprocket removably mounted on a non-divided drum which is connected to and rotates together with its shaft. The drum is provided with external teeth which mesh with internal teeth on both sprocket halves. Both sprocket halves are held together by locking disks which extend over shoulders on the sprocket halves, which latter are fixed to the drum by means of circlips or the like.

6 Claims, 2 Drawing Figures

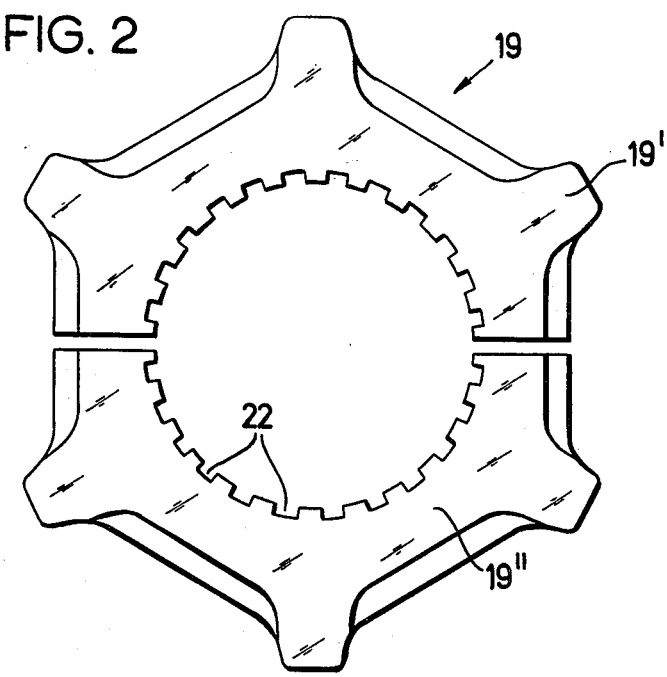

CHAIN DRUM FOR CHAIN CONVEYORS

BACKGROUND OF THE INVENTION

Cutter-loaders of various designs are known for excavating tunnels, adits and so on, as well as for mining minerals such as clay. A cutter-loader may be provided with a swinging cutter jib, on the free end of which is mounted a rotary cutting drum or the like. The jib may also have a conveyor onto which the broken rock excavated at the face by the cutter drum is loaded in order for it to be carried to the next transporter. The cutting head or drum may be driven by an endless chain which forms part of the conveyor and is equipped with conveying flights, the chain passing around a sprocket mounted on the cutting drum between the cutter picks.

In connection with such cutter-loaders and also in connection with scraper-chain conveyors used in mining and tunnelling generally, it is known to construct the chain drum in two halves, each drum half being welded to a sprocket half. By inter-connecting the two drum halves, the sprocket halves are combined to form a single sprocket. The sprockets of these chain drums, whether used for chain driving or return purposes are subject to severe wear. When the sprocket becomes so worn as to be no longer serviceable, both drum halves must be replaced together with the sprocket parts welded thereto. To reduce the high cost of complete replacement, it is known to remove the sprocket halves from the drum parts by flame cutting or machining operations and to replace them with new sprocket halves which are then welded to the drum halves. True alignment of the new sprocket halves is always difficult.

SUMMARY OF THE INVENTION

The object of this invention is to provide a chain drum suitable for use in driving or returning a chain and having a relatively simple design which permits the sprocket to be rapidly replaced.

This object is achieved in accordance with the invention by removably mounting a sprocket on a drum which rotates with its support shaft. The drum preferably comprises a one-piece sleeve mounted on the shaft which extends through the sleeve and is supported at both ends in a frame. The sleeve is provided in the vicinity of the sprocket with a ring of external teeth or the like which engage complementary teeth on the sprocket halves. Removable fixtures are provided to hold the sprocket halves tightly on the sleeve.

With this layout of the chain drum it is possible to replace worn-out sprocket halves quickly and without dismantling the whole drum. The shaft can be set in usual shaft bearings in the parallel side walls of the conveyor or cutter jib. To remove the shaft quickly when necessary, I prefer to provide at least one of the side walls with an opening for the shaft with a diameter in excess of the sleeve diameter, so that the sleeve can be withdrawn through the wall opening primarily intended for the shaft.

Preferably, the sprocket halves are provided with axial shoulders. To hold the sprocket halves on the sleeve it is possible to use substantially cup shaped locking disks which embrace the said shoulders of the sprocket halves. The locking disks are prevented from moving axially along the sleeve, by, for example, slotted circlips or the like. I also prefer to provide rings which are located between the removable fixing devices and locking disks, and which rest on the locking disks, the rings being secured against axial displacement by the same fixing devices.

Preferably the sleeve has a step in its outer face; the sprocket halves being mounted in the sleeve section with a larger diameter. Both sprocket halves are best made initially from a single workpiece which is then cut along a diameter. This ensures that both sprocket halves fit accurately to each other.

The chain drum provided by the invention is not intended to carry excessive torques and is therefore used with advantage in scraper-chain conveyors, cutter loaders and the like. However, it is also possible to use a chain drum in accordance with the invention as the driving or return drum of slat-, roller-, or round link chains in other conveyors having a single or double centre chain or lateral chains. It is understood that with double chain conveyors and belts the drum is provided with two split sprockets mounted for rapid replacement on a common chain drum in the described manner.

BRIEF DESCRIPTION OF THE DRAWINGS

FIG. 2 is a plan view of the sprocket of the driving drum shown in FIG. 1.

DESCRIPTION OF THE PREFERRED EMBODIMENT

Figure 1:
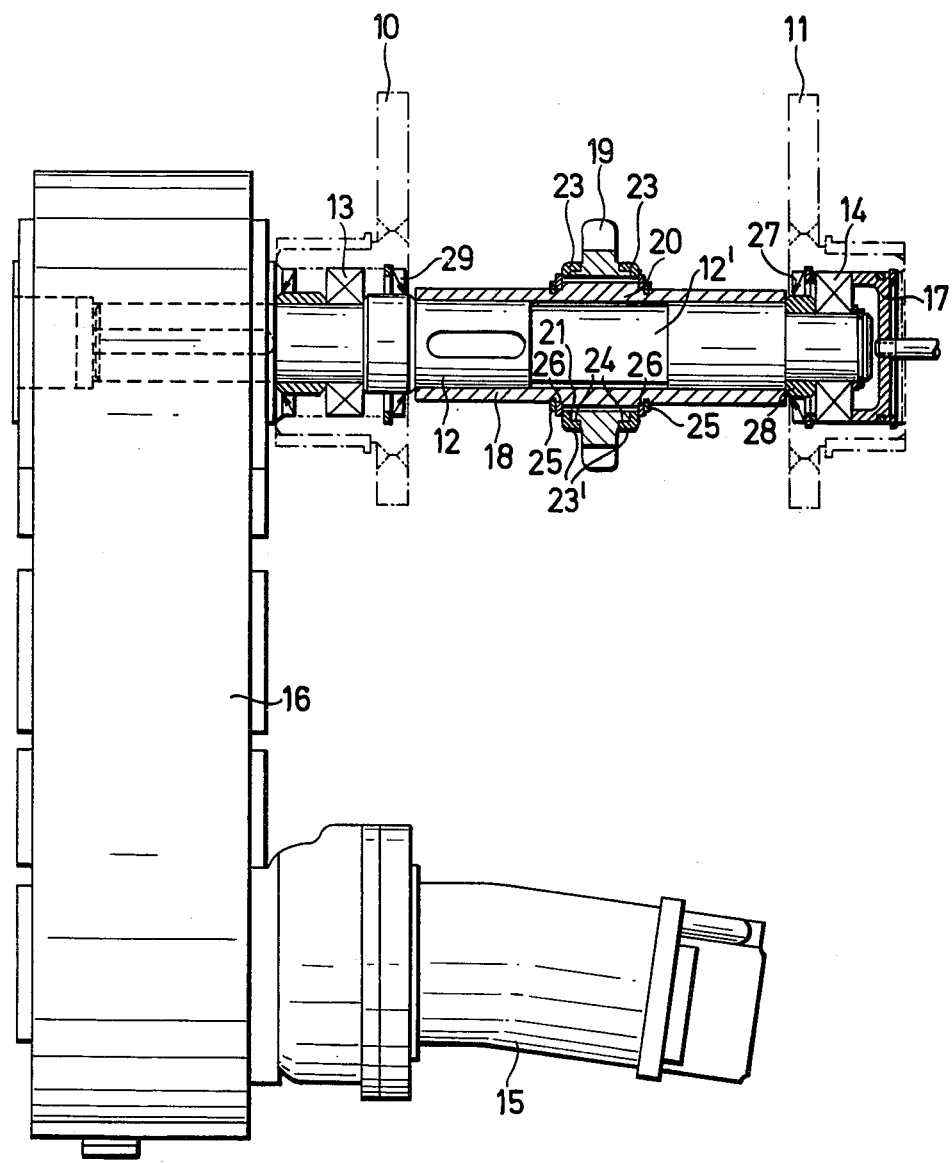
FIG. 1 is an axial section through a driving drum intended in particular for a chain flight conveyor mounted on the gib of a cutter-loader.

Referring to FIG. 1, the cutting jib of a cutter-loader has two parallel side walls 10, 11 which accommodate a scraper-chain conveyor. A shaft 12 for transmitting drive to the conveyor is held in bearings 13, 14. The shaft 12 is driven by a driving mechanism including a motor 15 and transmission 16 which are mounted laterally on one side wall 10 together with the bearing 13. In the opposite wall 11 is the shaft end bearing 14 sealed by a cover 17.

A one-piece sleeve 18 is mounted on the shaft 12 for rotation therewith, and is held in place by a key or wedge connection or the like. The sleeve extends from one side wall 10 to the other 11 and constitutes a drum on which a sprocket 19, diametrally split into two halves, is mounted centrally. The sleeve 18 is provided with shoulders so as to have a midsection 20 with a larger diameter provided with a ring of external involute teeth 21. The sprocket 19 consists as shown in FIG. 2, of two sprocket halves 19', 19" formed by cutting in two a one-piece sprocket. Both sprocket halves have internal teeth which are complementary to the teeth 21 on the sleeve.

The sprocket halves 19' and 19" are mounted on opposite sides of the sleeve 18, their internal teeth 22 engaging the external teeth 21 on the sleeve so that the sleeve and sprocket rotate together. The sprocket halves are held on the sleeve 18 by locking disks 23 which have a roughly dishshaped cross section and are forced in the axial direction onto the diametrally enlarged section 20 of the sleeve. The axially extending lips 23 of the disks embrace the axial annular shoulders 24 on the sprocket halves. The locking disks and thus the sprocket halves are prevented from becoming loose by slotted circlips 25 or the like which fit into annular slots in the sleeve. Annular plates 26 are provided between the circlips 25 and locking disks 23 and rest laterally against the locking disks 23 and the annular shoulders of the enlarged portion 20 of the sleeve. This arrangement ensures a fixed connection between the sprocket halves 19', 19" and the sleeve 18, so that they form a unit rotating in unison.

Worn sprocket halves are easily replaced by removing one of the two circlips 25. The annular plate 26 at this side and the locking disk can then be shifted axially outwards along sleeve 18 and the sprocket halves drawn off laterally from the toothed middle section 20 of the sleeve. Reassembly of the new sprocket halves is performed in reverse order.

The opening 27 in the wall 11 is large enough so that when it is necessary to replace the sleeve 18, it may be removed through this opening following withdrawal of bearing 14 and removal of cover 17 and spacer 28. The sleeve is removed from the stepped shaft 12 after releasing the key or other rotation-transmitting connection with the shaft.

In the illustrated embodiment, the opening 29 in the other wall 10 has such a diameter to let the shaft and sleeve pass through together. Shaft 12 has a section 12' with a smaller diameter in its central region where the sprocket is mounted.

It is also possible to manufacture the drum or sleeve 18 in two halves held together by screws. In this case, the drum is dismantled and reassembled through the side opening.

What is claimed is:

1. In a chain drum for a chain conveyor, in particular a scraper-chain conveyor mounted on a cutting jib of a cutter-loader or the like, having a shaft supported at axially spaced apart locations, the improvement comprising a one-piece sleeve separate from said shaft, said sleeve surrounding said shaft and being disposed between said axially spaced locations, means constraining the sleeve to rotate with the shaft, the sleeve being provided with external teeth, at least one diametrally split sprocket surrounding said sleeve, said at least one sprocket comprising two sprocket halves having axial shoulders, removable locking means overlapping said shoulder portions to hold said sprocket halves on said sleeve, and circlips holding the locking means in place against axial movement, the sprocket halves being provided with internal teeth which interengage with the teeth on the sleeve and constitute therewith a force-transmitting connection between the sleeve and the split sprocket, whereby said sprocket halves may be removed from said sleeve without disassembly from said shaft.

2. A chain drum as claimed in claim 1, wherein annular plates are disposed between the dished members and circlips.

3. A chain drum as claimed in claim 2, wherein the sleeve is provided with a portion of larger diameter having shoulders at its ends and the sprocket halves are mounted on the said sleeve portion.

4. A chain drum as claimed in claim 2, wherein bearings for the shaft are mounted in parallel sidewalls of the conveyor, cutter jib or the like, and at least one of said side walls has an opening for the shaft which has a diameter larger than that of the sleeve.

5. A chain drum as claimed in claim 4, wherein the sprocket halves are formed from a sprocket manufactured in one piece and split diametrally.

6. A chain drum as claimed in claim 5, wherein the sleeve has a smooth outer surface apart from the section for mounting the sprocket, and said smooth sleeve is removably fixed to the shaft.

* * * * *